(12) United States Patent
Tazawa et al.

(10) Patent No.: US 9,505,995 B2
(45) Date of Patent: Nov. 29, 2016

(54) SLAG DISCHARGE SYSTEM, GASIFIER, AND GASIFICATION POWER GENERATION APPARATUS

(75) Inventors: Naoyuki Tazawa, Tokyo (JP); Naoshige Yoshida, Tokyo (JP)

(73) Assignee: MITSUBISHI HITACHI POWER SYSTEMS, LTD., Kanagawa (JP)

(*) Notice: Subject to any disclaimer, the term of this patent is extended or adjusted under 35 U.S.C. 154(b) by 455 days.

(21) Appl. No.: 14/342,608

(22) PCT Filed: Sep. 6, 2012

(86) PCT No.: PCT/JP2012/072684
§ 371 (c)(1),
(2), (4) Date: Apr. 24, 2014

(87) PCT Pub. No.: WO2013/035766
PCT Pub. Date: Mar. 14, 2013

(65) Prior Publication Data
US 2014/0237986 A1    Aug. 28, 2014

(30) Foreign Application Priority Data

Sep. 7, 2011 (JP) ................................. 2011-195129

(51) Int. Cl.
*C10J 3/72* (2006.01)
*C10J 3/52* (2006.01)
*F02C 3/28* (2006.01)

(52) U.S. Cl.
CPC ...... *C10J 3/72* (2013.01); *C10J 3/526* (2013.01); *F02C 3/28* (2013.01); *C10J 2300/165* (2013.01); *Y02E 20/18* (2013.01)

(58) Field of Classification Search
CPC ...... C10J 3/72; C10J 3/526; C10J 2300/165; F02C 3/28; Y02E 20/18
See application file for complete search history.

(56) References Cited

U.S. PATENT DOCUMENTS 4,760,667 A * 8/1988 Eckstein .................. C10J 3/485
                                                          48/197 R
5,509,264 A * 4/1996 Ito ........................ F01K 23/067
                                                          60/39.12
(Continued)

FOREIGN PATENT DOCUMENTS

CN           86105182         3/1988
CN           2093360          1/1992
(Continued)

OTHER PUBLICATIONS

Decision to Grant a Patent issued Mar. 31, 2015 in corresponding Japanese patent application No. 2011-195129.
(Continued)

*Primary Examiner* — Corey Skurdal
(74) *Attorney, Agent, or Firm* — Wenderoth, Lind & Ponack, L.L.P.

(57) ABSTRACT

A slag discharge system that includes: a gasification furnace which thermally decomposes and gasifies a pulverized raw material composed of a carbonaceous solid; a slag hopper which is provided at a bottom portion of the gasification furnace and receives slag produced from the pulverized raw material and in which cooling water is stored; a lock hopper which temporarily stores the slag outside of the gasification furnace; and a slag discharge line which makes the slag hopper communicate with the lock hopper. The lock hopper is disposed to the side of the gasification furnace, and the slag discharge system is provided with a water flow forming apparatus for forming a flow of the cooling water which allows the slag to be led to the lock hopper in the slag discharge line.

16 Claims, 6 Drawing Sheets

(56) References Cited

U.S. PATENT DOCUMENTS

| | | | | |
|---|---|---|---|---|
| 6,032,467 | A | * | 3/2000 | Oshita .................. C10J 3/66 60/39.12 |
| 2008/0134658 | A1 | * | 6/2008 | Yoshida ............... F01K 23/068 60/39.12 |
| 2008/0141647 | A1 | * | 6/2008 | Yoshida .................. F02C 3/28 60/39.12 |
| 2008/0295480 | A1 | * | 12/2008 | Hyakutake ............... C10J 3/00 60/39.12 |
| 2010/0058730 | A1 | * | 3/2010 | Sonoda .................. F01D 21/14 60/39.12 |
| 2012/0196241 | A1 | * | 8/2012 | Koyama .................. C10J 3/52 432/86 |
| 2013/0133305 | A1 | * | 5/2013 | DePuy .................. C10J 3/86 60/39.12 |
| 2013/0183204 | A1 | * | 7/2013 | Benipal .................. B01D 3/06 422/187 |
| 2013/0283761 | A1 | * | 10/2013 | Takeuchi .................. C01B 3/16 60/39.12 |
| 2014/0230451 | A1 | * | 8/2014 | Shibata .................. C10J 3/485 60/781 |

FOREIGN PATENT DOCUMENTS

| | | |
|---|---|---|
| CN | 1122443 | 5/1996 |
| CN | 101942343 | 1/2011 |
| JP | 50-129605 | 10/1975 |
| JP | 58-21483 | 2/1983 |
| JP | 60-185009 | 9/1985 |
| JP | 61-243896 | 10/1986 |
| JP | 10-273680 | 10/1998 |
| JP | 11-140464 | 5/1999 |
| JP | 2002-80864 | 3/2002 |
| JP | 2006-206776 | 8/2006 |
| JP | 2007-170785 | 7/2007 |
| JP | 2011-74274 | 4/2011 |

OTHER PUBLICATIONS

Notification of Grant of Invention Patent issued Sep. 29, 2015 in corresponding Chinese patent application No. 201280043151.4 (with English translation).

Office Action issued Oct. 10, 2014 in corresponding Chinese patent application No. 201280043151.4 (with English translation).

International Search Report issued Oct. 9, 2012 in International Application No. PCT/JP2012/072684.

Written Opinion of the International Searching Authority issued Oct. 9, 2012 in International Application No. PCT/JP2012/072684.

"Design of Large Capacity Pressurized Two Stage Entrained Flow Type Coal Gasfier for Utility Power Plant", pp. 134-141, Mitsubishi Heavy Industries Technical Review, vol. 22, No. 5, Sep. 1985.

* cited by examiner

SLAG DISCHARGE SYSTEM, GASIFIER, AND GASIFICATION POWER GENERATION APPARATUS

TECHNICAL FIELD

The present invention relates to a slag discharge system of a gasification furnace which gasifies a pulverized raw material such as pulverized coal or the like made of a carbonaceous solid (coal, biomass fuel such as wood pallets, petroleum coke, or the like), a gasifier provided with the slag discharge system, and a gasification power generation apparatus.

BACKGROUND ART

In a gasification furnace which produces combustible gas by thermally decomposing a pulverized raw material composed of a carbonaceous solid, ash of the raw material is melted and deposited on a bottom portion of the gasification furnace as slag. In order to receive the slag, a water tank with cooling water retained therein is provided, and the slag is rapidly cooled by the cooling water, thereby being crushed and solidified. The slag accumulated in the water tank of the gasification furnace in a state of being solidified in this manner is discharged out of the gasification furnace by way of a lock hopper. Since the slag has a large difference in density from that of water that is the cooling water, in the past, when moving the slag from the water tank to the lock hopper, gravity has been used as a driving force. For example, in PTL 1, a slag discharge system in which a lock hopper is disposed below a gasification furnace is disclosed.

A slag discharge system 100 like this will be described using FIG. 7. A lock hopper inlet valve 105 is opened in a state where a lock hopper outlet valve 103 below a lock hopper 101 is closed, whereby slag settles out of a gasification furnace 107 from the inside of a water tank 109 provided at a lower portion of the gasification furnace 107. Subsequently, the slag accumulated in the lock hopper 101 is discharged to a slag relay tank 111 by opening the lock hopper outlet valve 103 in a state where the lock hopper inlet valve 105 is closed. The slag is transferred from the slag relay tank 111 to a slag slurry tank 115 by a screw conveyor 113. After the slag is slurried in the slag slurry tank 115, the slurried slag is pumped by using a slurry transfer pump 117, thereby reaching a dewatering tank 121 by way of a distributor 119. Thereafter, the slag is transferred to another treatment system by using a vehicle or the like.

CITATION LIST

Patent Literature

[PTL 1] Japanese Unexamined Patent Application Publication No. 2011-74274

SUMMARY OF INVENTION

Technical Problem

Incidentally, according to the slag discharge system 100 described above, in order to provide the lock hopper 101 below the gasification furnace 107, a disposition position of the gasification furnace 107 becomes higher. Accordingly, the height from an installation surface 99 of a plant to an upper portion of the gasification furnace 107 increases. The disposition position of the gasification furnace 107 becomes higher, whereby a disposition position of a support stand supporting the gasification furnace 107, an operation stand, or the like becomes higher. This contributes to an increase in cost. An increase in the height to the upper portion of the gasification furnace 107 is a factor in construction cost increase and also a factor that makes it difficult to mount incidental equipment such as a syngas cooler 71 on the upper portion of the gasification furnace 107.

The present invention has been made in view of such circumstances and has an object to provide a slag discharge system in which it is possible to reduce the height from a plant installation surface to an upper portion of a gasification furnace at the time of installation of a slag discharge system, a gasifier provided with the slag discharge system, and a gasification power generation apparatus.

Solution to Problem

In order to solve the above problem, the following solution is adopted.

According to a first aspect of the present invention, there is provided a slag discharge system including: a gasification furnace which thermally decomposes and gasifies a pulverized raw material composed of a carbonaceous solid; a water tank which is provided at a bottom portion of the gasification furnace and receives slag produced from the pulverized raw material and in which cooling water is stored; a lock hopper which temporarily stores the slag outside of the gasification furnace; and a slag discharge line which makes the water tank communicate with the lock hopper, wherein the lock hopper is disposed to the side of the gasification furnace, and the slag discharge system is provided with a water flow forming apparatus for forming a flow of the cooling water which allows the slag to be led to the lock hopper in the slag discharge line.

In a gasification furnace which thermally decomposes and gasifies a pulverized raw material (for example, pulverized coal) made of a carbonaceous solid, slag made of ash is produced along with combustible gas. A water tank which receives the slag produced in the gasification furnace and in which cooling water is stored is provided at a bottom portion of the gasification furnace. In order to operate the gasification furnace continuously, it is necessary to continuously or periodically discharge the slag accumulated in the water tank from the inside of the gasification furnace to the outside of a system. In order to discharge the slag out of the gasification furnace, a lock hopper is used as a container which temporarily stores the slag. In the past, since the gravity acting on the slag has been used for the transfer of the slag from the water tank to the lock hopper, the lock hopper has been inevitably disposed below the gasification furnace. Such disposition of the lock hopper increases the height from an installation surface of a plant to an upper portion of the gasification furnace.

In the slag discharge system according to the first aspect described above, since a flow which allows the cooling water in the water tank to be led to the lock hopper is formed in the slag discharge line by the water flow forming apparatus, it is possible to discharge the slag by being carried by the flow of the cooling water. As the water flow forming apparatus, an apparatus for making the pressure of a downstream end of the slag discharge line be a pressure different from the pressure of an upstream end of the slag discharge line can be taken. That is, an apparatus for making the pressure at the downstream end of the slag discharge line be a pressure lower than the pressure of the upstream end of the slag discharge line is included in the water flow forming apparatus. A water flow is formed in the slag discharge line with a force caused by a difference between the pressure of the downstream end of the slag discharge line and the pressure of the upstream end of the slag discharge line as a driving force.

Since it is possible to discharge the slag by being carried by the flow of the cooling water, it is not necessary to use the gravity acting on the slag for the transfer of the slag. That is, it becomes possible to dispose the lock hopper to the side of the gasification furnace. That is, in the slag discharge system according to the first aspect described above, it is possible to dispose the lock hopper to the side of the gasification furnace, and thus it is possible to reduce the height from the installation surface of the plant to the upper portion of the gasification furnace.

Further, due to the application of the slag discharge system according to the first aspect described above, since the lock hopper is disposed to the side of the gasification furnace, rather than below the gasification furnace, at least a portion of a slag treatment device which is subsequent to the lock hopper can be disposed below the lock hopper. According to such disposition, since it is possible to transfer the slag in the lock hopper to the next slag treatment device by using gravity, it is not necessary to use a screw conveyor, a slurry transfer pump, or the like for the transfer of the slag. Further, this aspect is not limited to the transfer of slag from a lock hopper, and by using the movement of slag by gravity, it is possible to simplify a slag discharge system on the downstream side of a lock hopper.

In addition, in the slag discharge system according to the first aspect described above, a water discharge port of a water injection line which injects the cooling water into the water tank is disposed in the vicinity of an upstream end of the slag discharge line.

Since the slag has larger specific gravity than the cooling water, the slag tends to settle to a bottom portion of the water tank. In order to discharge the slag by using the flow of the cooling water which is led to the lock hopper, it is preferable that the slag be in a state where it is easier for the slag to move along with the flow of the cooling water, rather than a settled state. For this reason, the slag in the water tank is stirred in the water tank by using a water flow of the cooling water which is injected from a stirring line, whereby a state where the slag is more easily led by the water flow is created. By disposing a water injection port for stirring in the vicinity of the upstream end of the slag discharge line, it is possible to easily discharge the stirred slag out of the water tank. Further, if the water injection port for stirring is disposed such that the water flow from the water injection port for stirring is directed to the slag settled to the bottom portion of the water tank, it is possible to effectively perform the stirring of the slag.

In addition, in the slag discharge system according to the first aspect described above, the water flow forming apparatus includes a water injection line which injects the cooling water into the water tank, and a water injection pump provided on the water injection line, and the water injection pump sucks the cooling water separated from the slag in the lock hopper and sends the cooling water to the water tank through the water injection line.

By driving the water injection pump, it is possible to form a flow of the cooling water heading for the lock hopper in the slag discharge line connected to the water injection line. The slag is separated from the cooling water supplied through the slag discharge line in the lock hopper, and thereafter, the cooling water sucked in by the water injection pump is injected to the water tank again. In this way, load on wastewater treatment equipment (not shown) which is required when discharging the cooling water to the outside is reduced.

Further, when reusing the cooling water from which the slag is separated, it is necessary to inject the cooling water into the water tank in the gasification furnace having a pressure higher than atmospheric pressure. In a case where the cooling water from which the slag is separated is injected into the water tank by discharging the cooling water at atmospheric pressure all at once, pressure raising capability greater than or equal to the differential pressure between the pressure in the gasification furnace and the atmospheric pressure is required for the water injection pump. On the other hand, in a case of injecting the cooling water into the water tank through a circulation flow path which includes the slag discharge line, the lock hopper, and the water injection line, since the pressure of the gasification furnace acts on the entirety of the circulation flow path, it is not necessary to raise the differential pressure between the pressure in the gasification furnace and the atmospheric pressure by the water injection pump. For this reason, in a case of injecting the cooling water into the water tank through the circulation flow path, it is possible to use the water injection pump with relatively small pressure raising capability.

In addition, a configuration is made in which the water injection pump is disposed on the water injection line and the cooling water from which the slag is separated in the lock hopper flows through the water injection pump. Therefore, it is possible to send the cooling water having less slag than the cooling water flowing through the slag discharge line to the water injection pump, and thus it is possible to reduce a failure rate of the water injection pump and thus reduce maintenance costs.

In addition, in the slag discharge system according to the first aspect described above, a cooler for cooling water is provided in the water injection line.

The cooler for cooling water is provided in the water injection line, whereby the cooling water which is led to the water tank is cooled. In this way, a cooling water circulation line which is used to reduce the temperature of the cooling water in the water tank can be configured in a flow path which includes the slag discharge line. It is possible to make the water injection pump be also used as a pump for the cooling water circulation line. That is, it is possible to realize a configuration which also has the function of the cooling water circulation line, in addition to the function of the water flow forming apparatus for forming a water flow in the slag discharge line.

In addition, the slag discharge system according to the first aspect described above further includes: a bypass line which is connected between a midway position of the slag discharge line and a midway position of the water injection line and leads a flow of the cooling water led to the slag discharge line to the water tank through the water injection pump and the cooler for cooling water; and a water flow direction switching apparatus for switching a water flow to any of flow paths which lead a flow of the cooling water led to the slag discharge line to the lock hopper.

In a case where the flow of the cooling water led from the water tank to the slag discharge line is selected so as to be a flow which is led to the lock hopper by the water flow direction switching apparatus, the slag in the water tank can be recovered in the lock hopper.

On the other hand, in a case where the flow of the cooling water led from the water tank to the slag discharge line is selected so as to be a flow which is led to the bypass line by the water flow direction switching apparatus, the cooling water in the water tank bypasses without being led to the lock hopper, passes through the water injection pump and the cooler for cooling water, and is then returned to the water tank. In this manner, it is possible to independently perform a process such as slag discharge treatment in the lock hopper while bypassing the lock hopper and maintaining the temperature of the cooling water in the water tank by the cooler for cooling water.

In addition, the slag discharge system according to the first aspect described above further includes: a slag intake port that is the upstream end of the slag discharge line; a cooling water introduction line having a downstream end connected to a midway position of the slag discharge line and having the other end connected to the water tank; and a cooling water intake port that is an upstream end of the cooling water introduction line, wherein the slag intake port is provided at a position lower than the cooling water intake port, and the slag discharge system is provided with an intake port switching apparatus for switching between the cooling water intake port and the slag intake port.

The slag which is contained in the cooling water being small is advantageous to a decrease in the failure rate or improvement in the life of the water injection pump, but becomes disadvantageous in that a slag discharge rate is reduced. Since the slag has larger specific gravity than the cooling water, the amount of slag which is contained in the cooling water changes due to a difference between the positions in a vertical direction of the intake ports. That is, two intake ports are provided and the slag intake port is mounted at a position lower than the cooling water intake port on one side, whereby, compared to a case where water intake is performed from the cooling water intake port, in a case where water intake is performed from the slag intake port, the amount of slag which is contained in the cooling water is increased. Then, in order to select whether water intake is performed from the slag intake port or the cooling water intake port, an intake port switching apparatus is provided. The intake port switching apparatus can select whether cooling water intake is mainly performed or slag intake is mainly performed. That is, the switching of a flow path is performed such that in a case where the slag is led to and treated in the lock hopper, the cooling water is taken in from the slag intake port and in a case where the cooling water is circulated by bypassing the lock hopper, the cooling water is taken in from the cooling water intake port.

In addition, in the slag discharge system according to the first aspect described above, the water discharge port in which the water injection line discharges the cooling water into the water tank is provided at a position higher than the slag intake port.

The water discharge port in which the water injection line discharges the cooling water into the water tank 5 is provided at a position higher than the slag intake port which takes the cooling water into the water tank, which is led to the water injection line. That is, since the cooling water taken in from the slag intake port provided at a position lower than the water discharge port is injected from the water discharge port provided at a higher position into the water tank through the cooler for cooling water provided in the water injection line, the cooling water having a relatively low temperature and large density is introduced from above to the cooling water in the water tank, which has a relatively high temperature and small density. In this manner, a difference in temperature is present in the vertical direction in the cooling water in the water tank, whereby a convection current according to the difference in temperature (that is, a difference in density) is generated. Since the slag is stirred in the water tank due to the convection current which is generated in the water tank, it becomes easy to discharge the slag along with the cooling water through the slag discharge line.

In addition, in the slag discharge system according to the first aspect described above, the water flow forming apparatus includes a flow rate regulating valve which regulates a flow rate in the slag discharge line, in the slag discharge line, and a water flow of the cooling water is formed in the slag discharge line by adjusting the flow rate of a flow which is formed in the slag discharge line with a difference in pressure between the water tank side and the lock hopper side as a driving force, by the adjustment of the degree of opening of the flow rate regulating valve.

In a gasification furnace, there is a gasification furnace which is regarded as a pressurizing furnace and is operated at a pressure higher than atmospheric pressure at the time of an operation. By using a difference in pressure between such a gasification furnace and the lock hopper, it is possible to move the cooling water through the slag discharge line and discharge the slag by being carried by a flow of the cooling water. In order to regulate the flow rate of the cooling water, the flow rate regulating valve is provided on the slag discharge line, and at the time of slag discharge, the flow rate regulating valve enters an open state. In this slag discharge system, since a difference in pressure between atmospheric pressure and the pressure in the gasification furnace which is higher than the atmospheric pressure is used as a driving force required for the movement of the cooling water, it is not necessary to provide a pump for supplying the cooling water.

In addition, in the slag discharge system according to the first aspect described above, the water flow forming apparatus includes: a pressurizing apparatus for raising the pressure in the lock hopper to the pressure in the gasification furnace by supplying gas into the lock hopper; a decompressing apparatus for reducing the pressure in the lock hopper; and a slag discharge valve which is provided in the slag discharge line and is closed at the time of pressure raising by the pressurizing apparatus and opened at the time of decompression by the decompressing apparatus.

The pressure in the lock hopper is raised to the pressure in the gasification furnace by supplying gas into the lock hopper by the pressurizing apparatus. Then, the pressure in the lock hopper is reduced by the decompressing apparatus, whereby a difference in pressure is formed between the lock hopper and the water tank. In this state, by opening the slag discharge valve, a flow of the cooling water heading for the lock hopper from the water tank is formed in the slag discharge line on the basis of the difference in pressure. In this way, the slag in the water tank is led to the lock hopper along with the cooling water.

In this manner, a difference in pressure is formed between the lock hopper and the water tank by the combination of the pressurizing apparatus and the decompressing apparatus, and a flow of the cooling water is formed in the slag discharge line due to the difference in pressure. That is, a regulating valve is not used in the slag discharge line. In this way, since a regulating valve in which wear of or damage to a valve body by the slag is of a concern is not used, reliability is improved.

In addition, in the slag discharge system according to the first aspect described above, a high-pressure fluid which is supplied from the pressurizing apparatus into the lock hopper includes at least one of air, oxygen, and nitrogen.

In a case where a fluid which includes at least one of air, oxygen, and nitrogen is used as the fluid which is injected from the pressurizing apparatus into the lock hopper, even if the fluid is directly released to the atmosphere, since it does not cause an adverse effect on the environment, it is not necessary to provide additional equipment for recovering a used fluid at a vent line or later or reducing the influence on the environment.

In addition, in the slag discharge system according to the first aspect described above, the high-pressure fluid which is supplied from the pressurizing apparatus into the lock hopper is compressed air from a boost air compressor which raises the pressure of boost air bled from a compressor of a gas turbine installation.

In an air-blown gasification furnace provided with a boost air compressor (BAC) which raises the pressure of the boost air bled from the compressor of the gas turbine installation, compressed air from the boost air compressor is used as the high-pressure fluid which is supplied into the lock hopper. In this way, it is not necessary to provide a new compressor in the slag discharge system.

In addition, according to a second aspect of the present invention, there is provided a gasifier including: a gasification furnace which thermally decomposes and gasifies a pulverized raw material composed of a carbonaceous solid; and the slag discharge system according to any one of the above.

In the gasifier using the slag discharge system described above, since the lock hopper can be installed to the side of the gasification furnace, it is possible to reduce the height from a plant installation surface to the upper portion of the gasification furnace. Further, since the lock hopper is disposed to the side of the gasification furnace, rather than below the gasification furnace, it is possible to dispose other slag treatment devices below the lock hopper. According to such disposition, since it is possible to transfer the slag in the lock hopper to the next slag treatment device by using gravity, it is not necessary to use a screw conveyor, a slurry transfer pump, or the like for the transfer of the slag. Further, this aspect is not limited to the transfer of slag from a lock hopper, and by using the movement of a slag by gravity, it is possible to provide a gasifier provided with a simplified slag discharge system on the downstream side of a lock hopper.

In addition, the gasifier according to the second aspect described above further includes a gas cooler which cools combustible gas produced in the gasification furnace, wherein the gas cooler is disposed above the gasification furnace.

In a gasifier, there is a case where a gas cooler which cools combustible gas produced in a gasification furnace is installed above the gasification furnace (a tower type). According to the gasifier having such a structure, since a crossover connecting the gasification furnace and the gas cooler can be omitted, it becomes possible to provide a gasifier which is superior in terms of cost. In the tower type gasifier, if a slag discharge system is provided below the gasification furnace, since the height from a plant installation surface to an upper portion of the gas cooler further increases, it is particularly preferable to dispose a lock hopper to the side of the gasification furnace.

In addition, according to a third aspect of the present invention, there is provided a gasification power generation apparatus including: the gasifier according to any one of the above; a gas turbine which is driven by combustion gas using combustible gas produced by the gasifier; and an electric power generator which generates electric power by obtaining power of the gas turbine.

Since the slag discharge system described above is provided, it is possible to use a gasification power generation apparatus with a reduced height from a plant installation surface. Since the lock hopper is disposed to the side of the gasification furnace, rather than below the gasification furnace, it is possible to dispose other slag treatment devices below the lock hopper. According to such disposition, since it is possible to transfer the slag in the lock hopper to the next slag treatment device by using gravity, it is not necessary to use a screw conveyor, a slurry transfer pump, or the like for the transfer of the slag. Further, this aspect is not limited to the transfer of slag from a lock hopper, and by using the movement of slag by gravity, it is possible to provide a gasification power generation apparatus provided with a simplified slag discharge system on the downstream side of a lock hopper.

Advantageous Effects of Invention

According to the present invention, since the lock hopper is disposed to the side of the gasification furnace, it is possible to reduce the height from the plant installation surface to the upper portion of the gasification furnace at the time of installation of a slag discharge system.

Further, due to the application of the present invention, since the lock hopper is disposed to the side of the gasification furnace, rather than below the gasification furnace, it becomes possible to dispose at least a portion of a slag treatment device which is subsequent to the lock hopper below the lock hopper, and since the slag can be transferred to the next slag treatment device by using gravity, it is not necessary to use a screw conveyor, a slurry transfer pump, or the like for the transfer of the slag. In addition, the present invention is not limited to the transfer of slag from a lock hopper, and by using the movement of slag by gravity, it becomes possible to simplify a slag discharge system on the downstream side of a lock hopper.

DESCRIPTION OF EMBODIMENTS

Hereinafter, embodiments according to the present invention will be described with reference to the drawings.

[First Embodiment]

Hereinafter, a first embodiment of the present invention will be described using FIG. 1.

In the same drawing, a slag discharge treatment system 1A suitable to be used in a coal gasification power generation apparatus (a gasification power generation apparatus) which performs an integrated coal gasification combined cycle (IGCC) is shown.

The coal gasification power generation apparatus is provided with a coal gasifier (a gasifier) which gasifies pulverized coal (pulverized raw material) obtained by crushing coal (a carbonaceous solid) by a mill or the like, a gas turbine (not shown) which is driven by combustion gas using combustible gas purified by the coal gasifier, an exhaust heat recovery boiler (HRSG: Heat Recovery Steam Generator) (not shown) which generates steam by exhaust gas of the gas turbine, a steam turbine (not shown) which is driven by the steam produced in the exhaust heat recovery boiler, and an electric generator (not shown) which generates electric power by obtaining the power of the gas turbine and the steam turbine.

The gas turbine is provided with a combustor (not shown) which burns the combustible gas purified by the coal gasifier, a turbine (not shown) which is rotationally driven by the combustion gas led from the combustor, and a compressor (not shown) which is rotated by obtaining a rotational driving force of the turbine, thereby compressing air and supplying air for combustion to the combustor.

Figure 5:
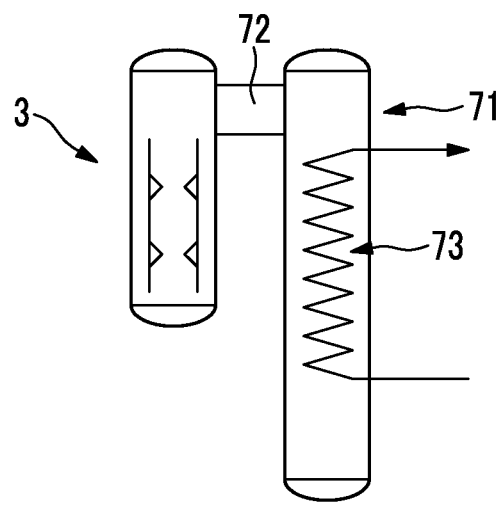
FIG. 5 is a configuration diagram showing a gasifier of the related art in which a gas cooler is disposed to the side of a gasification furnace.
Figure 6:
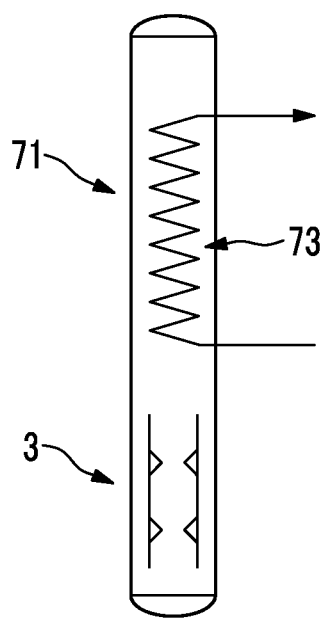
FIG. 6 is a configuration diagram showing a tower type gasifier in which a gas cooler is disposed above a gasification furnace.
Figure 7:
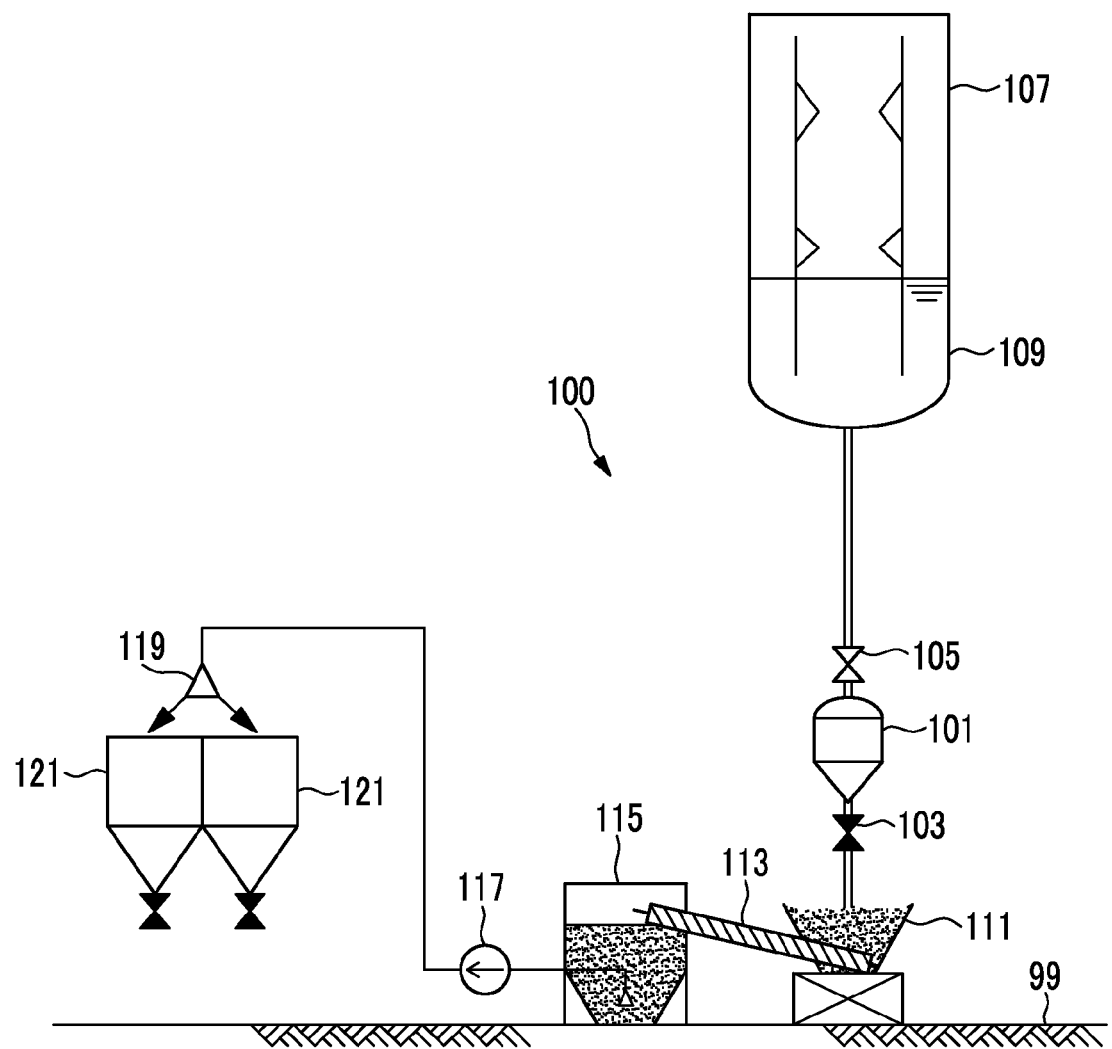
FIG. 7 is a side view showing a slag discharge system of the related art.

The coal gasifier is provided with a gasification furnace 3 which thermally decomposes and gasifies the supplied pulverized coal, and various equipment which is provided downstream of the gasification furnace 3 and cools and purifies gasified gas. In FIGS. 5 and 6, a syngas cooler (SGC) (a gas cooler) 71 connected to the downstream of the gasification furnace 3 is shown. The syngas cooler 71 is provided with a heat exchanger 73 which generates steam, and cools gas generated in the gasification furnace 3. There are a case where the syngas cooler 71 is disposed to the side of the gasification furnace 3 and connected to the gasification furnace 3 by a crossover 72, as shown in FIG. 5, and a case where the syngas cooler 71 is provided at an upper portion of the gasification furnace 3 (a tower type), as shown in FIG. 6.

The gasification furnace 3 is made to be, for example, a pressurized entrained bed type gasification furnace and is provided with an inner vessel 3a and an outer vessel 3b surrounding the inner vessel 3a.

In the inner vessel 3a, a combustor 3c which burns some of pulverized coal, thereby obtaining the amount of heat required for gasification reaction, and a reductor 3d which gasifies the pulverized coal by obtaining the amount of heat from the combustor 3c are disposed in two upper and lower stages.

A slag hopper (a water tank) 5 is provided at a bottom portion of the gasification furnace 3. Cooling water is stored in the slag hopper 5, and slag produced from the pulverized coal by the combustor 3c and the reductor 3d is received in the slag hopper 5.

A slag discharge line 7 which discharges the slag received in the slag hopper 5 out of the gasification furnace 3 is connected to the slag hopper 5. An upstream end of the slag discharge line 7 is a slag intake port 39 and is made so as to suck in the slag in the slag hopper 5 along with the cooling water. A downstream end of the slag discharge line 7 is connected to a lock hopper 9. The slag is discharged out of the gasification furnace 3 through the lock hopper 9. Further, a lock hopper inlet valve 11 is provided at a midway position of the slag discharge line 7.

The lock hopper 9 is disposed to the side of the gasification furnace 3 and at a height position higher than the bottom portion of the gasification furnace 3 (a bottom portion of the slag hopper 5). That is, the lock hopper 9 is not disposed immediately below the gasification furnace 3.

In the lock hopper 9, the cooling water and the slag are separated from slurry in which the cooling water and the slag are mixed. Specifically, the slurry led from the slag discharge line 7 flows into the lock hopper 9 with an enlarged flow path, whereby flow velocity is reduced to a velocity lower than or equal to a slag terminal velocity. At this time, the slag having larger specific gravity than water settles downward, whereby the slag is separated from the cooling water. In addition, as the lock hopper 9, instead of such a gravity settling type lock hopper, a centrifugal separation type lock hopper or a liquid cyclone type lock hopper may be used.

Further, a lock hopper outlet valve 21 is provided on the downstream side below the lock hopper 9, and the lock hopper outlet valve 21 is closed, whereby atmospheric pressure on the downstream side of the lock hopper 9 and high pressure on the upstream side (the gasification furnace 3 side) of the lock hopper 9 can be cut off from each other. By switching the pressure in the lock hopper 9 by using the lock hopper outlet valve 21 and the lock hopper inlet valve 11 described above, it is possible to discharge the slag to slag transport equipment on the downstream side of the lock hopper 9, which is under normal pressure (atmospheric pressure), without allowing the high pressure in the gasification furnace 3 to escape.

A water injection line 13 is connected between the lock hopper 9 and the slag hopper 5. The cooling water separated in the lock hopper 9 is returned to the slag hopper 5 by the water injection line 13 and injected from a water discharge port 40 into the slag hopper 5. In the water injection line 13, at midway positions thereof, a slag hopper water injection valve 15, a strainer 17 for removing foreign matter from the cooling water, and a water injection pump 19 for pushing the cooling water into the slag hopper 5 are provided in order from the upstream side of a cooling water flow. As will be described later, a flow of the cooling water is formed in the slag discharge line 7.

Further, in this embodiment, a stirring line 45 is connected to a midway position of the water injection line 13, and a water injection port for stirring 46 that is an end on the downstream side of the stirring line 45 is disposed in the vicinity of the slag intake port 39. A stirring line valve 43 is provided on the stirring line 45, and by opening and closing the stirring line valve 43, it is possible to appropriately inject the cooling water of the water injection line 13 from the water injection port for stirring 46 into the slag hopper 5 through the stirring line 45.

A distributor 23 and a dewatering tank 25 are provided downstream of the lock hopper 9 via the lock hopper outlet valve 21. The slag stored in the dewatering tank 25 is transferred to other slag treatment equipment by using a vehicle or the like.

Separately from the slag discharge line 7 and the water injection line 13, a cooling water circulation line 27 is connected to the slag hopper 5. A cooler intake port 26 which takes in the cooling water from the slag hopper 5 is provided at an upstream end of the cooling water circulation line 27, and a cooler discharge port 28 which discharges the cooling water to the slag hopper 5 is provided at a downstream end of the cooling water circulation line 27. At midway positions of the cooling water circulation line 27, a strainer 33 for removing foreign matter from the cooling water, a pump for circulation 29 for circulating the cooling water, and a cooler for cooling water 31 which cools the cooling water to a desired set temperature are provided in order from the upstream side of a cooling water flow. The temperature of the cooling water in the slag hopper 5 is maintained at less than or equal to a desired value by sequentially taking in and cooling the cooling water in the slag hopper 5 by the cooling water circulation line 27.

In this embodiment, a water flow forming apparatus includes the water injection line 13 which injects the cooling water into the slag hopper 5, and the water injection pump 19 provided on the water injection line 13, and the water injection pump 19 sucks the cooling water separated from the slag in the lock hopper 9 and sends the cooling water to the slag hopper 5 through the water injection line 13, whereby it is possible to make the pressure at the downstream end of the slag discharge line 7 be a pressure lower than the pressure of the upstream end of the slag discharge line 7. For this reason, since a flow of the cooling water which allows the slag to be led to the lock hopper 9 is formed in the slag discharge line 7, whereby it is possible to discharge the slag by being carried by the flow of the cooling water, it is not necessary to use the gravity acting on the slag for the transfer of the slag. That is, it is possible to dispose the lock hopper 9 to the side of the gasification furnace 3.

Figure 1:
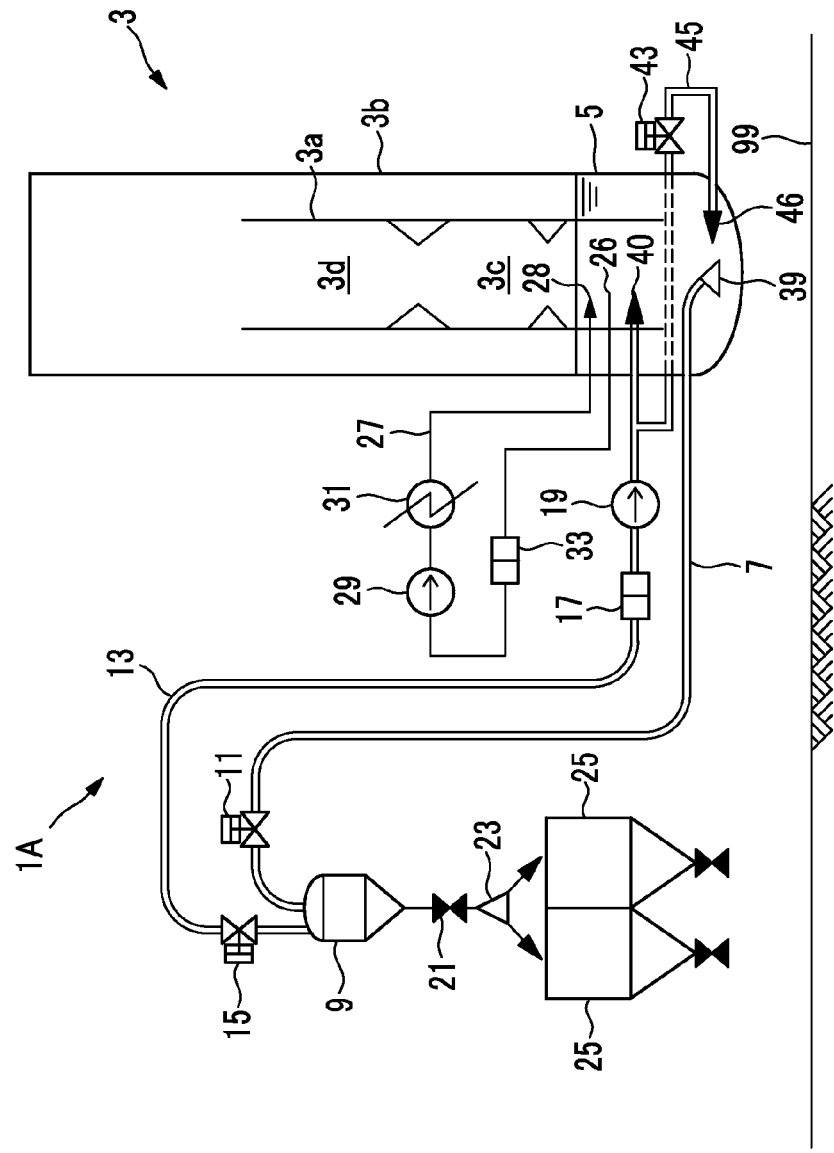
FIG. 1 is a side view showing a slag discharge system according to a first embodiment of the present invention.

In addition, in FIG. 1, a support structure is not shown between the gasification furnace 3, the lock hopper 9, or the like and an installation surface 99. However, this is only omitted for ease of understanding, and of course, in fact, the gasification furnace 3, the lock hopper 9, or the like is supported on the plant installation surface 99 by using a support structure.

The slag discharge system 1A according to this embodiment described above is used as follows.

<Time of Normal Operation>

At the time of a normal operation in which gasification is being performed in the gasification furnace 3, a process of discharging the slag from the slag hopper 5 is performed in parallel.

First, after the lock hopper outlet valve 21 is closed, the lock hopper inlet valve 11 and the slag hopper water injection valve 15 are opened. Then, the cooling water separated in the lock hopper 9 is sucked in and injected from the water discharge port 40 into the slag hopper 5 through the water injection line 13 by driving the water injection pump 19. In this way, a water flow is created between the slag intake port 39 that is the upstream end of the slag discharge line 7 and a connection portion to the lock hopper 9, that is the downstream end of the slag discharge line 7, and thus a driving force to push the cooling water out of the slag hopper 5 through the slag discharge line 7 is formed. In this way, a flow of the cooling water which allows the slag in the slag hopper 5 to be led to the lock hopper 9 through the slag discharge line 7 is formed.

Further, in a case where slag suction from the slag intake port 39 is difficult, by opening the stirring line valve 43, it is possible to promote the slag suction from the slag intake port 39 by injecting the cooling water from the water injection port for stirring 46 into the slag hopper 5 through the stirring line 45 and thus stirring the slag.

<Time of Slag Discharge>

When discharging the slag led into and separated in the lock hopper 9 to the dewatering tank 25, after the water injection pump 19 is stopped and the lock hopper inlet valve 11 and the slag hopper water injection valve 15 are closed, the lock hopper outlet valve 21 is opened. In this way, the slag in the lock hopper 9 is led to the dewatering tank 25 through the distributor 23 on the lower side. At this time, since the dewatering tank 25 is installed below the lock hopper 9, it is possible to transfer the slag in the lock hopper 9 to the dewatering tank by using gravity, and therefore, it is not necessary to use a screw conveyor 113, a slurry transfer pump 117, or the like for the transfer of the slag.

According to this embodiment, the following operation and effects are exhibited.

In the present invention, since differential pressure is generated in the slag discharge line 7 by operating the water injection pump 19 provided in the water injection line 13, whereby a flow which allows the cooling water in the slag hopper 5 to be led to the lock hopper 9 is formed in the slag discharge line 7, it is possible to discharge the slag by being carried by the flow of the cooling water. For this reason, since it is not necessary to use gravity for the discharge of the slag, it is possible to dispose the lock hopper 9 to the side of the gasification furnace 3, rather than below the gasification furnace 3. Therefore, it is possible to reduce the height from the installation surface 99 of the plant to the upper portion of the gasification furnace 3. Further, since the dewatering tank 25 is installed below the lock hopper 9, it is possible to transfer the slag in the lock hopper 9 to the dewatering tank 25 by using gravity, and therefore, it is not necessary to use the screw conveyor 113, the slurry transfer pump 117, or the like for the transfer of the slag.

This is particularly effective in the case of the tower type gasification furnace shown in FIG. 6.

Further, by stirring the slag in the slag hopper 5 by using a water flow of the cooling water which is injected from the water injection port for stirring 46 into the slag hopper 5, and thus creating a state where it is easier for the slag to be led by the water flow, it is possible to smoothly discharge the slag out of the gasification furnace 3.

Further, due to a configuration in which the cooling water separated in the lock hopper 9 is sucked in by the water injection pump 19 and led from the water injection line 13 to the slag hopper 5, it is possible to make the flow of the cooling water smooth, thereby effectively forming a cooling water flow in the slag discharge line 7.

Since the cooling water separated in the lock hopper 9 is returned from the water injection line 13 to the slag hopper 5 and the cooling water used when discharging the slag is circulated and reused, it is possible to reduce load of drainage equipment (not shown) which is required when discharging the cooling water to the outside.

Further, in a case where the cooling water from which the slag is separated is injected by discharging the cooling water into the water tank 5 in the gasification furnace 3 having a pressure higher than atmospheric pressure at atmospheric pressure once, pressure raising capability greater than or equal to differential pressure between the pressure in the gasification furnace 3 and the atmospheric pressure is required for the water injection pump 19. However, in a case of injecting the cooling water into the water tank 5 through a circulation flow path which includes the slag discharge line 7, the lock hopper 9, and the water injection line 13, since the pressure of the gasification furnace 3 acts on the entirety of the circulation flow path, it is not necessary to raise the differential pressure between the pressure in the gasification furnace 3 and the atmospheric pressure by the water injection pump 19. For this reason, in a case of injecting the cooling water into the water tank 5 through the circulation flow path, it is possible to use the water injection pump 19 with relatively small pressure raising capability.

In addition, since the cooling water flowing through the water injection line 13 is the cooling water from which the slag is separated in the lock hopper 9, the amount of slag which is included therein is smaller than the cooling water flowing in the slag discharge line 7. Then, a pump (the water injection pump 19) to form a water flow in the slag discharge line 7 is provided on the water injection line 13, rather than the slag discharge line 7. In this way, it is possible to reduce a failure rate of the pump and thus reduce maintenance costs.

[Second Embodiment]

Next, a second embodiment of the present invention will be described using FIG. 2.

In addition, the same portions as those in the first embodiment described above are denoted by the same reference numerals and the detailed description thereof is omitted.

This embodiment is different from the first embodiment in that a configuration is made such that the slag discharge line 7 and the water injection line 13 have the function of the cooling water circulation line 27 described in the first embodiment. Therefore, in this embodiment, as shown in FIG. 2, the cooling water circulation line 27 shown in FIG. 1 is omitted.

A three-way valve for bypass (water flow direction switching apparatus) 35 is provided in the slag discharge line 7. A bypass line 36 is connected to the three-way valve for bypass 35. The bypass line 36 connects a midway position of the slag discharge line 7 and a midway position of the water injection line 13. A flow of the cooling water led from the slag hopper 5 to the slag discharge line 7 is switched to a flow to be led to the lock hopper 9 or a flow to be led to the water injection line 13 through the bypass line 36, by the three-way valve for bypass 35. In this manner, since the three-way valve for bypass 35 switches the cooling water flow, thereby being able to cut off the cooling water flow heading for the lock hopper 9, the three-way valve for bypass 35 also has the function of the lock hopper inlet valve 11 in FIG. 1 shown in the first embodiment. In addition, instead of the three-way valve for bypass 35, a switching valve having the same function may be configured by providing two two-way valves.

In the slag discharge line 7, a three-way valve for water intake (water flow direction switching apparatus) 41 is provided on the upstream side of the three-way valve for bypass 35. A downstream end of a cooling water introduction line 38 is connected to the three-way valve for water intake 41. A cooling water intake port 37 which is located in the slag hopper 5 is provided at an upstream end of the cooling water introduction line 38. A flow to introduce the cooling water from the inside of the slag hopper 5 through the cooling water intake port 37 and a flow to introduce the slag through the slag intake port 39 are selected by switching the three-way valve for water intake 41. In addition, instead of the three-way valve for water intake 41, a switching valve having the same function may be configured by providing two two-way valves.

Figure 2:
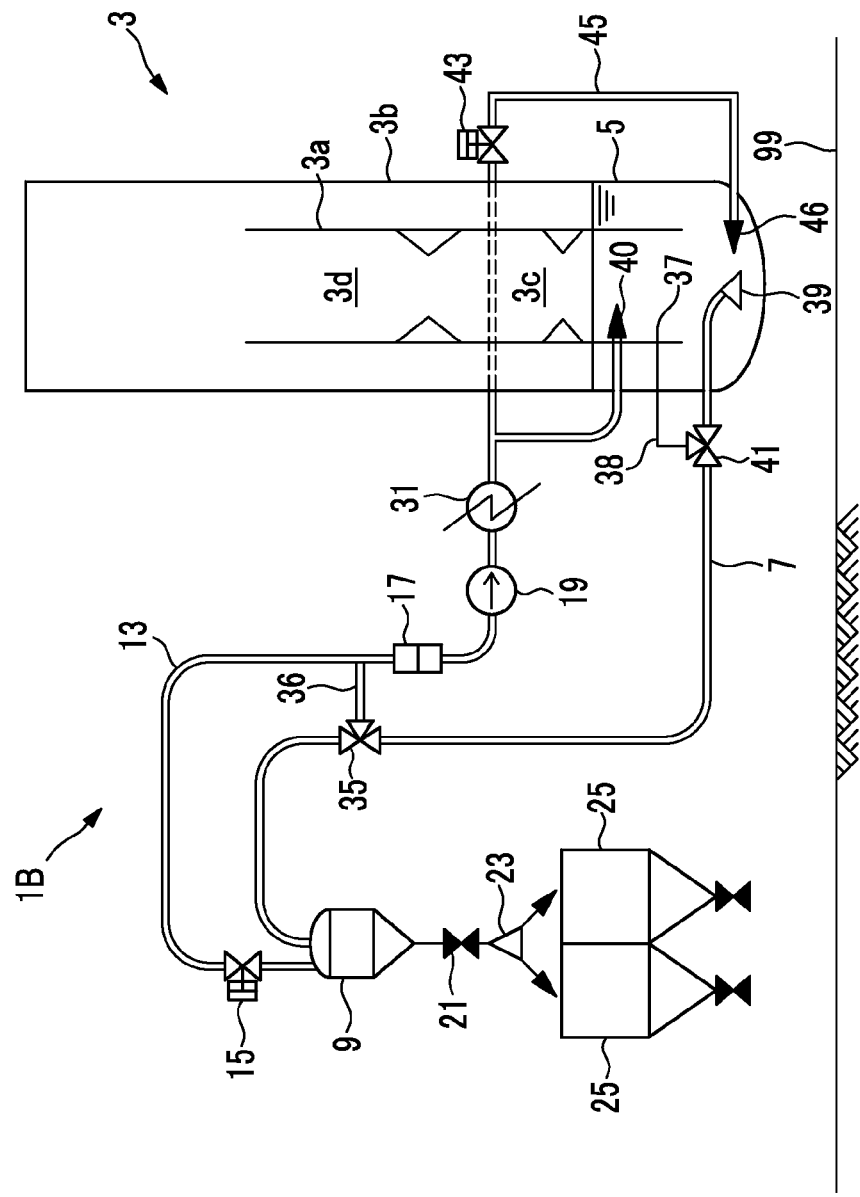
FIG. 2 is a side view showing a slag discharge system according to a second embodiment of the present invention.

The cooling water intake port 37 is located above the slag intake port 39, as shown in FIG. 2. Further, the water discharge port 40 of the water injection line 13 is located above the slag intake port 39.

Further, in this embodiment, the stirring line 45 is connected to a midway position of the water injection line 13, and the water injection port for stirring 46 that is an end on the downstream side of the stirring line 45 is disposed in the vicinity of the slag intake port 39. The stirring line valve 43 is provided in the stirring line 45, and by opening and closing the stirring line valve 43, it is possible to appropriately inject the cooling water of the water injection line 13 from the water injection port for stirring 46 into the slag hopper 5 through the stirring line 45.

The cooler for cooling water 31 is provided on the downstream side of the water injection pump 19 provided in the water injection line 13. The cooling water which is returned into the slag hopper 5 is cooled to a desired temperature by the cooler for cooling water 31. Therefore, the water injection pump 19 also has the function of the pump for circulation 29 shown in FIG. 1 of the first embodiment.

A slag discharge system 1B according to this embodiment described above is used as follows.

<Time of Normal Operation>

At the time of a normal operation in which gasification is being performed in the gasification furnace 3, a process of discharging the slag from the slag hopper 5 is performed in parallel.

First, the three-way valve for water intake 41 selects a flow from the slag intake port 39 and the three-way valve for bypass 35 selects a flow to the lock hopper 9. Further, after the lock hopper outlet valve 21 is closed, the slag hopper water injection valve 15 is opened. Then, the cooling water separated in the lock hopper 9 is sucked in and injected from the water discharge port 40 into the slag hopper 5 by driving the water injection pump 19. In this way, similar to the first embodiment, differential pressure is formed in the slag discharge line 7, and this a flow of the cooling water to allow the slag to be led to the lock hopper 9 in the slag discharge line 7 is formed.

Further, in a case where slag suction from the slag intake port 39 is difficult, by opening the stirring line valve 43, it is possible to promote the slag suction from the slag intake port 39 by injecting the cooling water from the water injection port for stirring 46 into the slag hopper 5 through the stirring line 45 and thus stirring the slag.

<Time of Slag Discharge>

When discharging the slag led into and separated in the lock hopper 9 to the dewatering tank 25, the three-way valve for water intake 41 selects a flow from the cooling water intake port 37 and the three-way valve for bypass 35 selects a flow to the bypass line 36. Further, after the slag hopper water injection valve 15 is closed, the lock hopper outlet valve 21 is opened. Then, the cooling water in the slag hopper 5 is sucked in from the cooling water intake port 37 and returned into the slag hopper 5 through the three-way valve for water intake 41, the slag discharge line 7, the three-way valve for bypass 35, the bypass line 36, and the water injection line 13 by driving the water injection pump 19. That is, the cooling water in the slag hopper 5 is circulated so as to bypass the lock hopper 9. When the cooling water is circulated in this manner, since the cooling water is cooled to a desired temperature by the cooler for cooling water 31 provided in the water injection line 13, the temperature of the cooling water in the slag hopper 5 is maintained at a desired temperature.

Further, as described above, since it is possible to cut off the lock hopper 9 from the slag hopper 5 side by using the bypass line 36, the slag in the lock hopper 9 is led to the dewatering tank 25 through the distributor 23 on the lower side by opening the lock hopper outlet valve 21.

According to this embodiment, the following operation and effects are exhibited.

The cooler for cooling water 31 is provided in the water injection line 13, whereby the cooling water which is returned to the slag hopper 5 is cooled. In this way, the cooling water circulation line (refer to reference numeral 27 in FIG. 1) used to reduce the temperature of the cooling water in the slag hopper 5 can be configured by the water injection line 13 and the slag discharge line 7, and the water injection pump 19 is also used as the pump for circulation 29 shown in FIG. 1. That is, it is possible to realize a configuration which has also the function of the cooling water circulation line, in addition to the function of the water flow forming apparat us for forming a water flow in the slag discharge line 7.

By providing the three-way valve for bypass 35 and the bypass line 36, thereby forming a circulation water flow which bypasses the lock hopper 9 and cools the cooling water by the cooler for cooling water 31, it is possible to independently perform a process such as slag discharge treatment in the lock hopper 9 while maintaining the temperature of the cooling water in the slag hopper 5.

Third Embodiment

Next, a third embodiment of the present invention will be described using FIG. 3.

In addition, the same portions as those in FIG. 1 related to the first embodiment described above are denoted by the same reference numerals and the detailed description thereof is omitted.

In the first embodiment and the second embodiment described above, a method to push the cooling water from the water injection line 13 into the slag hopper 5 by the water injection pump 19, thereby forming a flow of the cooling water heading for the lock hopper 9 in the slag discharge line 7 is adopted. However, this embodiment adopts a method to form a flow of the cooling water in the slag discharge line 7 by using the pressure in the gasification furnace 3 which is in a pressurized state, without using the water injection pump 19.

Figure 3:
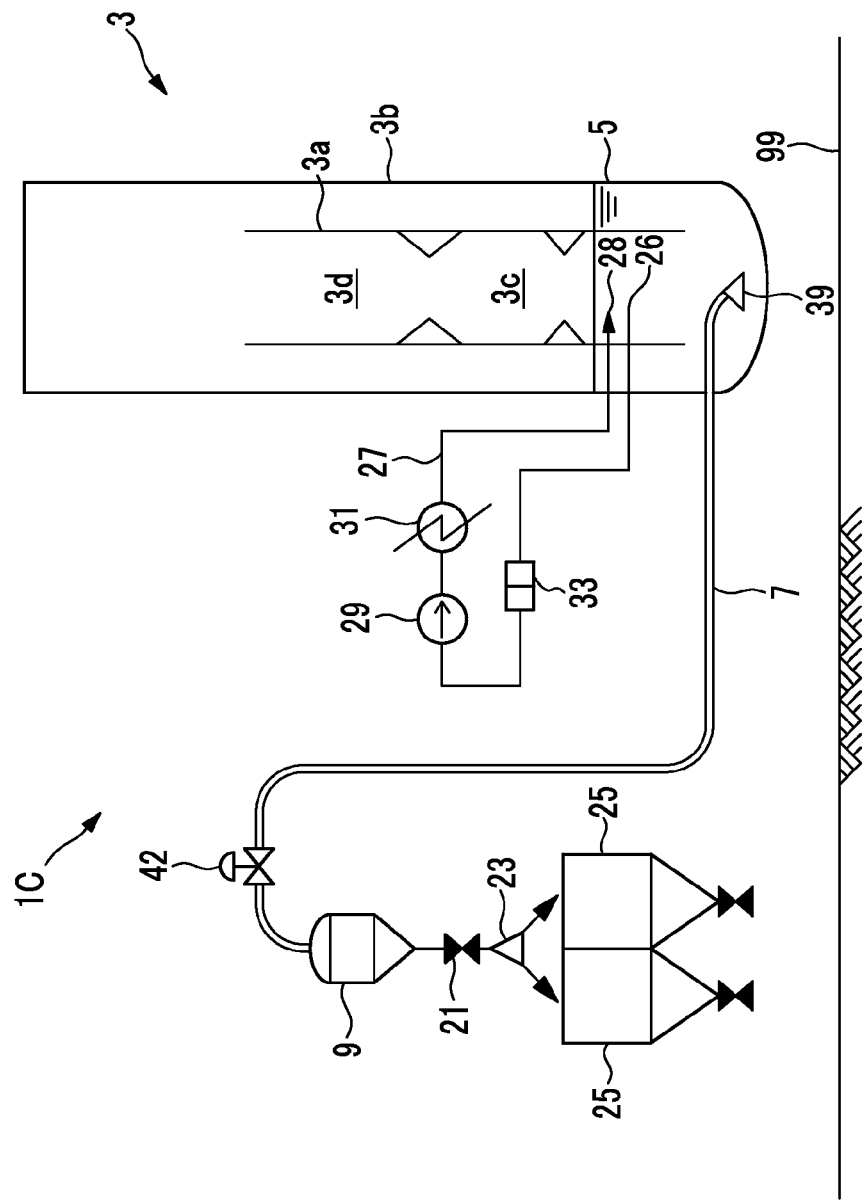
FIG. 3 is a side view showing a slag discharge system according to a third embodiment of the present invention.

As shown in FIG. 3, this embodiment is identical to that in FIG. 1 of the first embodiment in that this embodiment is provided with the slag discharge line 7. However, this embodiment is different from that in FIG. 1 of the first embodiment in that this embodiment is not provided with the water injection line 13 in a state of connecting the lock hopper 9 and the slag hopper 5. In the slag discharge line 7, a lock hopper inlet valve (water flow forming apparatus) 42 having a flow rate regulating function is provided at a position corresponding to the lock hopper inlet valve 11 of the first embodiment. Due to the lock hopper inlet valve 42, a cooling water flow is formed in the slag discharge line 7 by using a difference in pressure between the slag hopper 5 and the lock hopper 9.

Since the cooler discharge port 28 in which the cooling water cooled in the cooler for cooling water 31 is injected to the slag hopper 5 is mounted in an upper portion of the slag hopper 5 and thus the cooling water having a lower temperature than the cooling water in the slag hopper 5 is supplied from the cooler discharge port 28, a convection current based on a difference in temperature (that is, a difference in density) of the cooling water can be generated in the slag hopper 5. The slag is stirred in the slag hopper 5 due to the convection current, and thus it is possible to easily draw the slag from the slag intake port 39 of the slag discharge line 7.

Further, it is also possible to stir the slag in the slag hopper 5 by using a water flow which is generated when injecting the cooling water separated from the slag in a slag discharge system on the downstream side of the lock hopper 9 or cooling water which is newly injected into the slag hopper 5, into the slag hopper 5 by using the water injection line 13.

A slag discharge system 1C according to this embodiment described above is used as follows.

<Time of Normal Operation>

At the time of a normal operation in which gasification is being performed in the gasification furnace 3, a process of discharging the slag from the slag hopper 5 is performed in parallel.

When discharging the slag from the slag hopper 5, after the lock hopper outlet valve 21 is closed, the degree of opening of the lock hopper inlet valve 42 is adjusted to a predetermined value. The pressure in the lock hopper 9 is at atmospheric pressure. On the other hand, the pressure in the slag hopper 5 depends on the pressure in the gasification furnace 3 and is regarded as a positive pressure higher than or equal to atmospheric pressure because the gasification furnace 3 is regarded as a pressurizing furnace. Therefore, a difference in pressure is formed between the lock hopper 9 and the slag hopper 5. By setting the degree of opening of the lock hopper inlet valve 42 to a predetermined value by using the difference in pressure, it is possible to form a flow of the cooling water in the slag discharge line 7 at a desired flow rate. In this way, a flow of the cooling water which allows the slag in the slag hopper 5 to be led to the lock hopper 9 through the slag discharge line 7 is formed.

<Time of Slag Discharge>

When discharging the slag led into and separated in the lock hopper 9 to the dewatering tank 25, after the lock hopper inlet valve 42 is fully closed, the lock hopper outlet valve 21 is opened. In this way, the slag in the lock hopper 9 is led to the dewatering tank 25 through the distributor 23 on the lower side. At this time, since the dewatering tank 25 is installed below the lock hopper 9, it is possible to use gravity, and thus a configuration is made in which machinery equipment for transporting the slag, such as the screw conveyor 113 or the slurry pump 117, can be omitted.

According to this embodiment, the following operation and effects are exhibited.

Due to the difference in pressure between the slag hopper 5 and the lock hopper 9, the cooling water is moved through the slag discharge line 7 by using the lock hopper inlet valve 42 and the slag is discharged by being carried by a flow of the cooling water. In this manner, since the difference in pressure is used as a driving force required for the movement of the cooling water, it is not necessary to provide a pump for supplying the cooling water. Therefore, it is possible to reduce not only installation costs corresponding to a pump, but also maintenance costs.

Since the cooler discharge port 28 in which the cooling water cooled in the cooler for cooling water 31 is injected into the slag hopper 5 is mounted in the upper portion of the slag hopper 5 and it is possible to stir the slag in the slag hopper 5 by using the convection current generated in this way, it is possible to easily draw the slag from the slag intake port 39 of the slag discharge line 7.

Further, in a case of injecting the cooling water separated from the slag in the slag discharge system on the downstream side of the lock hopper 9 or cooling water which is newly injected into the slag hopper 5, into the slag hopper 5 by using the water injection line 13, the slag in the slag hopper 5 is stirred by using a water flow which is generated by injecting the cooling water into the slag hopper 5, and thus a state where the slag is more easily led by the water flow is created, whereby it is possible to smoothly discharge the slag in the gasification furnace 3 out of the gasification furnace 3.

[Fourth Embodiment]

Next, a fourth embodiment of the present invention will be described using FIG. 4.

In addition, the same portions as those in FIG. 3 related to the third embodiment are denoted by the same reference numerals and the detailed description thereof is omitted.

In this embodiment, similar to the third embodiment, a flow of the cooling water is formed in the slag discharge line 7 by using the pressure of the gasification furnace 3 which is in a pressurized state.

Figure 4:
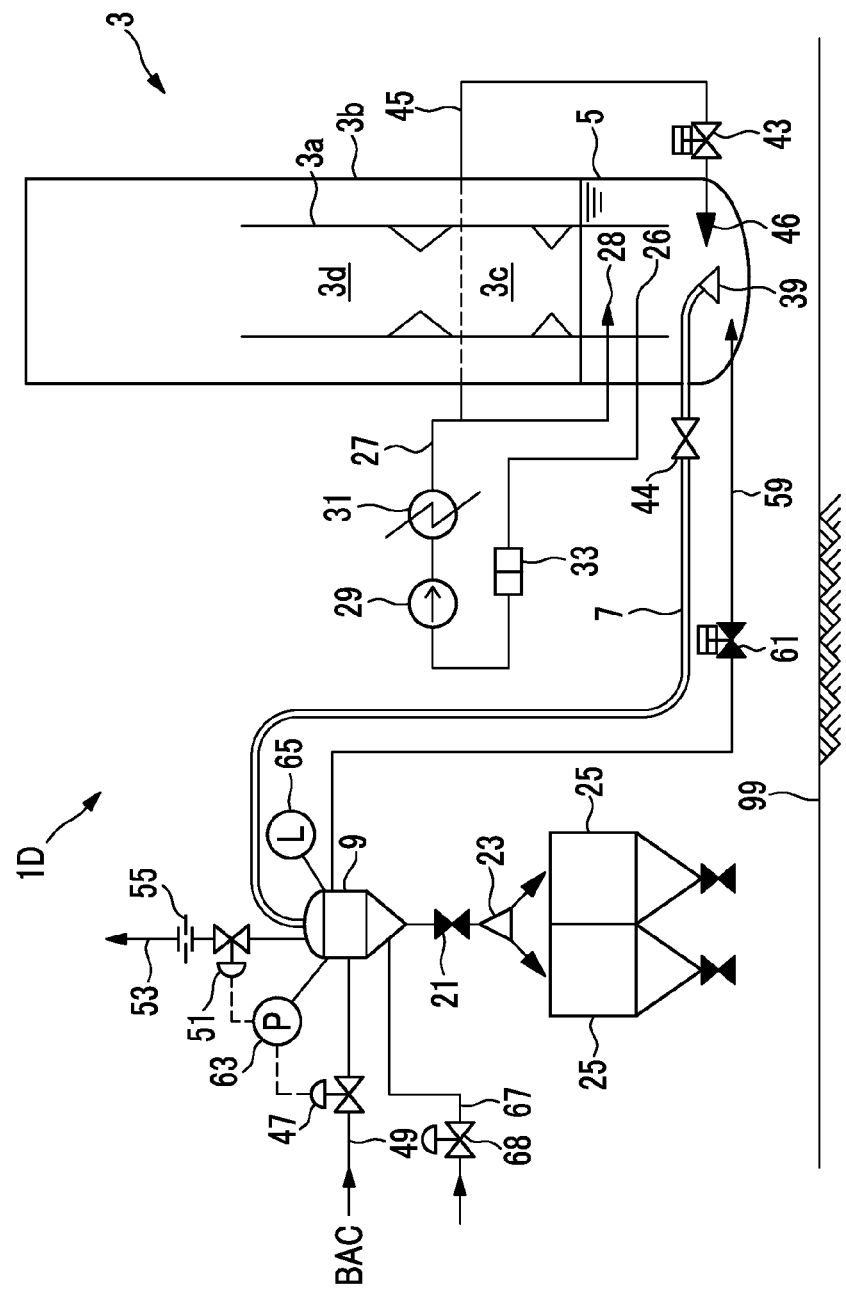
FIG. 4 is a side view showing a slag discharge system according to a fourth embodiment of the present invention.

As shown in FIG. 4, a lock hopper inlet valve 44 is provided in the slag discharge line 7. The lock hopper inlet valve 44 is different from the lock hopper inlet valve 42 (refer to FIG. 3) of the third embodiment which performs flow rate adjustment depending on the degree of opening of a valve and is regarded as an on-off valve having no flow rate adjustment function. Therefore, in the lock hopper inlet valve 42 of the third embodiment, there is a risk of wear of a valve body by the slag. However, in this embodiment, the lock hopper inlet valve 44 is made to be an on-off valve, whereby wear of a valve body by the slag is avoided.

A compressed air injection line (pressurizing apparatus) 49 which leads high-pressure air (a high-pressure fluid) from the boost air compressor (BAC) is connected to the lock hopper 9. The boost air compressor is for further raising the pressure of compressed air bled from the compressor of the gas turbine and is provided in an air-blown gasification furnace using air as an oxidizing agent of the gasification furnace. In addition, in the case of an oxygen-blown gasification furnace using oxygen as an oxidizing agent of a gasification furnace, oxygen and/or nitrogen obtained by an air separator may be used as a high-pressure fluid which is injected into the lock hopper 9.

An air pressure regulating valve (pressurizing apparatus) 47 is provided in the compressed air injection line 49. The air pressure regulating valve 47 is made such that the degree of opening thereof is adjusted by a control section (not shown) on the basis of the measured pressure of a pressure sensor 63 which measures the pressure in the lock hopper.

A release-to-atmosphere line 53 which discharges gas in the lock hopper 9 to an aerial space is provided at the lock hopper 9. A release gas regulating valve 51 and an orifice 55 provided on the downstream side of the release gas regulating valve 51 are provided in the release-to-atmosphere line 53. The release gas regulating valve 51 is made such that the degree of opening thereof is adjusted by the control section (not shown) on the basis of the measured pressure of the pressure sensor 63 described above. The orifice 55 is made to be a fixed throttle, and thus, even if the function of the release gas regulating valve 51 is impaired and thus a fully opened state is created, the orifice 55 avoids release of the cooling water. Since predetermined pressure loss is provided by the orifice 55, even in a case where the release gas regulating valve 51 enters a fully opened state, it is possible to maintain the pressure in the lock hopper 9 at a pressure greater than or equal to a predetermined value, thereby preventing the cooling water from being taken away from the inside of the slag hopper 5 in large quantities and maintaining the water level of the cooling water in the slag hopper 5 at a value greater than or equal to a predetermined value.

A level meter 65 which measures a water level in the lock hopper 9 is provided in the lock hopper 9. A water level in the lock hopper 9 becoming greater than or equal to a predetermined value is detected by the level meter 65, and a slag discharge process is then started, as will be described later.

Further, a lock hopper water injection line 67 for injecting the cooling water collected in the slag discharge system on the downstream side of the lock hopper 9 or new cooling water for replenishing into the gasification furnace 3 is connected to the lock hopper 9. Then, a lock hopper water injection valve 68 is provided on the lock hopper water injection line 67. In addition, a cooling water return line 59 which returns the cooling water to the slag hopper 5 is provided between the lock hopper 9 and the slag hopper 5, and a cooling water return valve 61 is provided in the cooling water return line 59.

Further, in this embodiment, the stirring line 45 is connected to a midway position of the cooling water circulation line 27 and the water injection port for stirring 46 that is an end on the downstream side of the stirring line 45 is disposed in the vicinity of the slag intake port 39. The stirring line valve 43 is provided in the stirring line 45, and by opening and closing the stirring line valve 43, it is possible to appropriately inject the cooling water of the cooling water circulation line 27 from the water injection port for stirring 46 into the slag hopper 5 through the stirring line 45.

In this embodiment, the water flow forming apparatus includes the compressed air injection line 49 for raising the pressure in the lock hopper 9 to the pressure in the gasification furnace 3 by supplying gas into the lock hopper 9, the air pressure regulating valve 47 provided in the compressed air injection line 49, the release-to-atmosphere line 53 for reducing the pressure in the lock hopper, and the release gas regulating valve 51 provided in the release-to-atmosphere line 53, and it is possible to reduce the pressure in the lock hopper 9 from a state of being approximately equal to the pressure in the slag hopper 5 by the release gas regulating valve 51 and thus make the pressure at the downstream end of the slag discharge line 7 be a pressure lower than the pressure of the upstream end of the slag discharge line 7. For this reason, since it is possible to form a flow of the cooling water which allows the slag to be led to the lock hopper 9, in the slag discharge line 7, and discharge the slag by being carried by the flow of the cooling water, it is not necessary to use the gravity acting on the slag for the transfer of the slag. That is, it is possible to dispose the lock hopper 9 to the side of the gasification furnace 3.

A slag discharge system 1D according to this embodiment described above is used as follows.

<Time of Normal Operation>

At the time of a normal operation in which gasification is being performed in the gasification furnace 3, a process of discharging the slag from the slag hopper 5 is performed in parallel.

Since the initial state before a process of discharging the slag from the slag hopper 5 is started is regarded as being after a previous slag discharge process is finished, the slag or the cooling water does not remain in the lock hopper 9 and the pressure in the lock hopper 9 is in a state of being approximately equal to atmospheric pressure. In this state, compressed air is injected from the boost air compressor into the lock hopper 9 through the compressed air injection line 49 in a state where the lock hopper outlet valve 21, the lock hopper inlet valve 44, the release gas regulating valve 51, and the cooling water return valve 61 are closed. At this time, the degree of opening of the air pressure regulating valve 47 is adjusted based on the measured pressure of the pressure sensor 63 by the control section (not shown). Specifically, the compressed air is supplied into the lock hopper 9 until the pressure in the lock hopper 9 rises from atmospheric pressure, thereby reaching a pressure equal to the pressure in the gasification furnace 3 (that is, the pressure of the slag hopper 5) or exceeding by a predetermined value. If the pressure in the lock hopper 9 reaches a predetermined value, the air pressure regulating valve 47 is fully closed, and thus the supply of the compressed air is stopped.

Next, the lock hopper inlet valve 44 is fully opened and the release gas regulating valve 51 is opened. The degree of opening of the release gas regulating valve 51 is adjusted based on the measured pressure of the pressure sensor 63 by the control section (not shown). The release gas regulating valve 51 is opened, whereby gas in the lock hopper 9 is released to an aerial space through the release-to-atmosphere line 53. In this way, the pressure in the lock hopper 9 is reduced and a difference in pressure is formed between the pressure in the lock hopper 9 and the pressure in the slag hopper 5. The slag in the slag hopper 5 is taken in from the slag intake port 39 with the difference in pressure as a driving force, and the slag is led to the lock hopper 9 along with the cooling water through the slag discharge line 7.

Further, the stirring line valve 43 is opened at the time of the slag suction, whereby the cooling water is injected from the water injection port for stirring 46 into the slag hopper 5 through the stirring line 45 and stirs the slag in the slag hopper 5, and thus it is possible to promote the slag suction from the slag intake port 39.

A water level in the lock hopper 9 rises as the slag is taken from the slag hopper 5 into the lock hopper 9. If the water level exceeds a predetermined threshold value, the level meter 65 detects the timing and informs the control section (not shown) of it. The control section (not shown) recognizes that the water level in the lock hopper 9 reaches a predetermined value, and makes the transition to a subsequent slag discharge process.

<Time of Slag Discharge>

If the water level in the lock hopper 9 reaching a predetermined value is detected by the level meter 65, after the release gas regulating valve 51 is fully closed, the lock hopper inlet valve 44 is fully closed.

Then, the lock hopper outlet valve 21 is fully opened, whereby the slag led into and separated in the lock hopper 9 is discharged to the dewatering tank 25. In this way, the slag in the lock hopper 9 is led to the dewatering tank 25 through the distributor 23 on the lower side. At this time, since the dewatering tank 25 is installed below the lock hopper 9, it is possible to use gravity, and thus a configuration is made in which machinery equipment for transporting the slag, such as the screw conveyor 113 or the slurry pump 117, can be omitted.

<Time of Return of Cooling Water>

In a case of injecting the cooling water collected in the slag discharge system on the downstream side of the lock hopper 9 or new cooling water for replenishing into the slag hopper 5, in a state where the lock hopper outlet valve 21, the lock hopper inlet valve 44, the compressed air injection line 49, the release gas regulating valve 51, and the cooling water return valve 61 are closed, the lock hopper water injection valve 68 is opened, and thus water injection from the lock hopper water injection line 67 into the lock hopper 9 is performed. If a water level in the lock hopper 9 rises and the water level exceeds a predetermined threshold value, the level meter 65 detects the timing and informs the control section (not shown) of it. The control section (not shown) recognizes that the water level in the lock hopper 9 reaches a predetermined value, and closes the lock hopper water injection valve 68. Subsequently, compressed air is injected from the boost air compressor into the lock hopper 9 through the compressed air injection line 49. At this time, the degree of opening of the air pressure regulating valve 47 is adjusted based on the measured pressure of the pressure sensor 63 by the control section (not shown). Specifically, the compressed air is supplied into the lock hopper 9 until the pressure in the lock hopper 9 rises, thereby reaching a pressure exceeding by a predetermined value the pressure in the gasification furnace 3 (that is, the pressure of the slag hopper 5). If the pressure in the lock hopper 9 reaches a predetermined value, the air pressure regulating valve 47 is closed. In addition, the cooling water return valve 61 is opened, whereby the cooling water is returned into the slag hopper 5.

According to this embodiment, the following operation and effects are exhibited.

A pressure equal to the pressure in the slag hopper 5 is formed in the lock hopper 9 by supplying compressed air through the compressed air injection line 49, and the pressure in the lock hopper 9 becomes lower than the pressure in the slag hopper 5 by opening the release gas regulating valve 51, and thus a cooling water flow is formed in the slag discharge line 7. That is, since the flow rate regulating valve 42 as in the third embodiment is not used in the slag discharge line 7 and a regulating valve in which wear of or damage to a valve body by the slag is of a concern is not used, reliability is improved.

Further, it is not necessary to install a pump for forming a cooling water flow in the slag discharge line 7. Therefore, it is possible to configure a slag discharge system with high reliability.

In addition, since it is possible to discharge the slag by being carried by a flow of the cooling water, it is not necessary to use the gravity acting on the slag for the transport of the slag. That is, it is possible to dispose the lock hopper 9 to the side of the gasification furnace 3.

In addition, in each embodiment described above, description has been made with a slag discharge system which is used in a coal gasification power generation apparatus. However, the present invention is not limited thereto, and if it is a slag discharge system which discharges slag which is discharged from a gasification furnace, a form thereof does not matter. For example, it is also possible to use the slag discharge system in a gasifier which is not provided with a power generation apparatus and purifies desired chemical species.

Further, a case of using pulverized coal as a raw material has been described. However, the present invention is not limited thereto, and if it is a pulverized raw material composed of a carbonaceous solid, it is possible to apply the present invention thereto.

REFERENCE SIGNS LIST

1A, 1B, 1C, 1D: slag discharge system
3: gasification furnace
5: slag hopper (water tank)
7: slag discharge line
9: lock hopper
11: lock hopper inlet valve
13: water injection line
19: water injection pump
27: cooling water circulation line (water injection line)
31: cooler for cooling water
35: three-way valve for bypass (water flow direction switching apparatus)
36: bypass line
37: cooling water intake port
38: cooling water introduction line
39: slag intake port
40: water discharge port
41: three-way valve for water intake (intake port switching apparatus)
42: lock hopper inlet valve (flow rate regulating valve)
43: stirring line valve
44: lock hopper inlet valve (slag discharge valve)
45: stirring line (water injection line)

47: air pressure regulating valve (pressurizing apparatus)
49: compressed air injection line (pressurizing apparatus)
51: release gas regulating valve (decompressing apparatus)
53: release-to-atmosphere line (decompressing apparatus)
71: gas cooler (syngas cooler)

The invention claimed is:

1. A slag discharge system comprising:
a gasification furnace which thermally decomposes and gasifies a pulverized raw material composed of a carbonaceous solid;
a water tank which is provided at a bottom portion of the gasification furnace and receives slag produced from the pulverized raw material and in which cooling water is stored;
a lock hopper which temporarily stores the slag outside of the gasification furnace; and
a slag discharge line which makes the water tank communicate with the lock hopper,
wherein the lock hopper is disposed to the side of the gasification furnace, and
the slag discharge system is provided with a water flow forming apparatus for forming a flow of the cooling water which allows the slag to be led to the lock hopper in the slag discharge line.

2. The slag discharge system according to claim 1, wherein a water discharge port of a water injection line which injects the cooling water into the water tank is disposed in the vicinity of an upstream end of the slag discharge line.

3. The slag discharge system according to claim 2, wherein the water flow forming apparatus includes
the water injection line, and
a water injection pump provided on the water injection line, and
the water injection pump sucks the cooling water separated from the slag in the lock hopper and sends the cooling water to the water tank through the water injection line.

4. The slag discharge system according to claim 3, wherein a cooler for cooling water is provided in the water injection line.

5. The slag discharge system according to claim 4, further comprising:
a bypass line which is connected between a midway position of the slag discharge line and a midway position of the water injection line and forms a flow path which leads a flow led from the slag discharge line to the water tank through the water injection pump and the cooler for cooling water; and
a water flow direction switching apparatus for switching a flow of the cooling water led from the water tank to the slag discharge line to a flow which is led to the lock hopper or a flow which is led to the bypass line.

6. The slag discharge system according to claim 5, further comprising:
a slag intake port that is the upstream end of the slag discharge line;
a cooling water introduction line having a downstream end connected to a midway position of the slag discharge line and having the other end connected to the water tank; and
a cooling water intake port that is an upstream end of the cooling water introduction line,
wherein the slag intake port is provided at a position lower than the cooling water intake port, and the slag discharge system is provided with an intake port switching apparatus for switching between the cooling water intake port and the slag intake port.

7. The slag discharge system according to claim 6, wherein the water discharge port in which the water injection line discharges the cooling water into the water tank is provided at a position higher than the slag intake port.

8. The slag discharge system according to claim 1, wherein the water flow forming apparatus includes a flow rate regulating valve which regulates a flow rate in the slag discharge line, in the slag discharge line, and
a water flow of the cooling water is formed in the slag discharge line by using a difference in pressure between the water tank side and the lock hopper side by the flow rate regulating valve.

9. The slag discharge system according to claim 1, wherein the water flow forming apparatus includes
a pressurizing apparatus for raising pressure in the lock hopper to a pressure in the gasification furnace by supplying gas into the lock hopper;
a decompressing apparatus for reducing the pressure in the lock hopper; and
a slag discharge valve which is provided in the slag discharge line and is closed at the time of pressure raising by the pressurizing apparatus and opened at the time of decompression by the decompressing apparatus.

10. The slag discharge system according to claim 9, wherein a high-pressure fluid which is supplied from the pressurizing apparatus into the lock hopper includes at least one of air, oxygen, carbon dioxide, and nitrogen.

11. The slag discharge system according to claim 10, wherein the high-pressure fluid which is supplied from the pressurizing apparatus into the lock hopper is compressed air from a boost air compressor which raises the pressure of boost air bled from a compressor of a gas turbine installation.

12. A gasifier comprising:
a gasification furnace which thermally decomposes and gasifies a pulverized raw material composed of a carbonaceous solid; and
the slag discharge system according to claim 1.

13. The gasifier according to claim 12, further comprising:
a gas cooler which cools combustible gas produced in the gasification furnace,
wherein the gas cooler is disposed above the gasification furnace.

14. A gasification power generation apparatus comprising:
the gasifier according to claim 12;
a gas turbine which is driven by combustion gas using combustible gas produced by the gasifier; and
an electric power generator which generates electric power by obtaining power of the gas turbine.

15. A slag discharge method of discharging slag from a gasification furnace which thermally decomposes and gasifies a pulverized raw material composed of a carbonaceous solid, comprising:
a step of receiving the slag produced from the pulverized raw material and storing cooling water in a water tank provided at a bottom portion of the gasification furnace;
a step of temporarily storing the slag from the water tank in a lock hopper disposed to the side of the gasification furnace through a slag discharge line; and
a step of performing water injection from the lock hopper into the water tank through a water injection line.

16. A slag discharge method of discharging slag from a gasification furnace which thermally decomposes and gasifies a pulverized raw material composed of a carbonaceous solid, comprising:
- a step of receiving the slag produced from the pulverized raw material and storing cooling water in a water tank provided at a bottom portion of the gasification furnace;
- a step of raising pressure of a gas phase portion in the lock hopper to a pressure in the gasification furnace by supplying gas into the lock hopper; and
- a step of reducing the pressure of the gas phase portion in the lock hopper and temporarily storing the slag from the water tank in a lock hopper disposed to the side of the gasification furnace through a slag discharge line.

* * * * *